United States Patent
Zhang et al.

(10) Patent No.: US 12,424,197 B2
(45) Date of Patent: Sep. 23, 2025

(54) CUSTOM TONE AND VOCAL SYNTHESIS METHOD AND APPARATUS, ELECTRONIC DEVICE, AND STORAGE MEDIUM

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventors: Zhengchen Zhang, Beijing (CN); Junyi Wu, Beijing (CN); Yuyu Cai, Beijing (CN); Xin Yuan, Beijing (CN); Wei Song, Beijing (CN); Xiaodong He, Beijing (CN)

(73) Assignees: Beijing Wodong Tianjun Information Technology Co., Ltd., Beijing (CN); BEIJING JINGDONG CENTURY TRADING CO., LTD, Beijing (CN)

( * ) Notice: Subject to any disclaimer, the term of this patent is extended or adjusted under 35 U.S.C. 154(b) by 249 days.

(21) Appl. No.: 18/252,186

(22) PCT Filed: Dec. 23, 2021

(86) PCT No.: PCT/CN2021/140858
§ 371 (c)(1),
(2) Date: May 8, 2023

(87) PCT Pub. No.: WO2022/156479
PCT Pub. Date: Jul. 28, 2022

(65) Prior Publication Data
US 2023/0410786 A1    Dec. 21, 2023

(30) Foreign Application Priority Data
Jan. 20, 2021    (CN) .......................... 202110076168.0

(51) Int. Cl.
*G10L 13/033* (2013.01)
*G10L 13/027* (2013.01)
(Continued)

(52) U.S. Cl.
CPC .......... *G10L 13/027* (2013.01); *G10L 13/033* (2013.01); *G10L 13/08* (2013.01); *G10L 15/063* (2013.01); *G10L 15/16* (2013.01)

(58) Field of Classification Search
CPC ....... G10H 2250/455; G10H 2210/066; G10H 1/0033; G10L 13/033; G10L 13/02;
(Continued)

(56) References Cited

U.S. PATENT DOCUMENTS 5,478,969 A * 12/1995 Cardey, III .............. G10H 1/46
84/626
5,986,199 A * 11/1999 Peevers ................ G10H 1/0025
84/603
(Continued)

FOREIGN PATENT DOCUMENTS

| CN | 104272382 A | 1/2015 |
| CN | 104766603 A | 7/2015 |

(Continued)

OTHER PUBLICATIONS

Notice of Allowance dated May 7, 2024 for Japanese Application No. 2023-516595.
(Continued)

*Primary Examiner* — Jakieda R Jackson
(74) *Attorney, Agent, or Firm* — Qinghong Xu

(57) ABSTRACT

A custom tone and vocal synthesis method and apparatus, an electronic device, and a storage medium. The synthesis method comprises: training a first neural network by means of a speaker record sample to obtain a speaker recognition model, the output training result of the first neural network
(Continued)

being a speaker vector sample (S102); training a second neural network by means of an unaccompanied vocal singing sample and the speaker vector sample to obtain an unaccompanied singing synthesis model (S104); inputting a speaker record to be synthesized into the speaker recognition model to obtain speaker information output by the intermediate hidden layer of the speaker recognition model (S106); and inputting unaccompanied singing music information to be synthesized and the speaker information into the unaccompanied singing synthesis model to obtain a synthesized custom tone and vocal (S108).

20 Claims, 15 Drawing Sheets

(51) Int. Cl.
  *G10L 13/08* (2013.01)
  *G10L 15/06* (2013.01)
  *G10L 15/16* (2006.01)
(58) Field of Classification Search
  CPC ..... G10L 13/10; G10L 21/003; G10L 13/027; G10L 13/08; G10L 15/063; G10L 15/16; G10L 25/90
  See application file for complete search history.

(56) References Cited

U.S. PATENT DOCUMENTS

| | | | |
|---|---|---|---|
| 6,182,044 B1* | 1/2001 | Fong | G10L 25/48 704/207 |
| 11,475,887 B2* | 10/2022 | Stoller | G10L 15/22 |
| 2013/0019738 A1* | 1/2013 | Haupt | G10H 1/06 84/622 |
| 2014/0372080 A1* | 12/2014 | Chu | G10H 1/0008 702/189 |
| 2015/0025892 A1* | 1/2015 | Lee | G10L 21/007 704/258 |
| 2015/0310850 A1* | 10/2015 | Nakano | G10H 1/0066 704/258 |
| 2018/0232446 A1* | 8/2018 | Zhu | G10L 25/90 |
| 2018/0350336 A1* | 12/2018 | Zhao | G10H 1/0025 |
| 2019/0019500 A1* | 1/2019 | Jang | G10L 15/063 |
| 2019/0221225 A1* | 7/2019 | Bricklin | G10L 13/033 |
| 2019/0320281 A1* | 10/2019 | Guo | G10L 19/00 |
| 2020/0043518 A1* | 2/2020 | Jansson | G06N 5/046 |
| 2020/0135156 A1* | 4/2020 | Zhang | G10H 1/361 |
| 2020/0135172 A1 | 4/2020 | Chen et al. | |
| 2020/0312287 A1* | 10/2020 | Galuten | G10H 1/0025 |
| 2020/0357389 A1* | 11/2020 | Bai | G10L 25/21 |
| 2020/0372896 A1* | 11/2020 | Cui | G10L 13/08 |
| 2021/0012764 A1* | 1/2021 | Yoo | H04R 3/12 |

FOREIGN PATENT DOCUMENTS

| | | |
|---|---|---|
| CN | 108461079 A | 8/2018 |
| CN | 111354332 A | 6/2020 |
| CN | 111583900 A | 8/2020 |
| CN | 111681637 A | 9/2020 |
| CN | 111798821 A | 10/2020 |
| CN | 111862937 A | 10/2020 |
| CN | 111899720 A | 11/2020 |
| CN | 113781993 A | 12/2021 |
| JP | 2016071187 A | 5/2016 |
| JP | 2019219570 A | 12/2019 |
| JP | 2020076843 A | 5/2020 |
| JP | 2020515905 A | 5/2020 |
| WO | 2019222591 A1 | 11/2019 |
| WO | 2022156479 A1 | 7/2022 |

OTHER PUBLICATIONS

Hevang Xue et al. "LEARN2SING: Target Speaker Singing Voice Synthesis by Learning From a Singing Teacher" arXiv:2011. 08467v1 [cs.SD], Nov. 17, 2020(Nov. 17, 2020), parts 2-4.
Sercan Ö.Ank et al."Deep Voice 2: Multi-Speaker Neural Text-to-Speech" 31st Conference on Neural Information Processing Systems (NIPS 2017), Dec. 9, 2021(Dec. 9, 2021), section 4 and figure 2.
International Search Report dated Mar. 23, 2022 of International Application PCT/CN2021/140858.
1st Office Action dated Nov. 28, 2023 of Chinese Application No. 202110076168.0.
Heyang Xue, "LEARN2SINGTARGET Speaker Singing Voice Synthesis by Learning From a Singing Teacher", arXiv, Nov. 17, 2020.
Sercan O. Arik, "Deep Voice 2: Multi-Speaker Neural Text-to-Speech," arXiv, Sep. 20, 2017.

* cited by examiner

CUSTOM TONE AND VOCAL SYNTHESIS METHOD AND APPARATUS, ELECTRONIC DEVICE, AND STORAGE MEDIUM

The present disclosure is an US national phase of International Application No. PCT/CN2021/140858, filed on Dec. 23, 2021, which claims the priority of China patent application with the application number of 202110076168.0, filed Jan. 20, 2021, titled "CUSTOM TONE AND VOCAL SYNTHESIS METHOD AND APPARATUS, ELECTRONIC DEVICE, AND STORAGE MEDIUM", and all contents of which are incorporated herein by reference.

TECHNICAL FIELD

The present disclosure relates to the technical field of sound synthesis, in particular, to a method and apparatus for synthesizing a customized timbre vocal, an electronic device and a storage medium.

BACKGROUND

With the rapid development of artificial intelligence industry, intelligent voice synthesis technology has penetrated into many fields, and has been applied to the smart home, voice navigation, intelligent customer service and other businesses, and the voice synthesized by artificial intelligence is highly anthropomorphic, which can reach the standard of replacing labor. In order to meet the needs of user timbre diversity, the existing timbre customization function is becoming more and more mature, and the user-specific timbre can be trained by means of a small amount of audio of linguistic data of the user. At the same time, with the increasing popularity of virtual idols, vocal synthesis has become one of the main development directions of voice synthesis technology. At present, the existing vocal synthesis technology, such as the "VOCALOID" synthesizer on which virtual idols rely, mainly relies on establishing a corpus based on voice data of real person, then cutting the lyrics provided by users, then retrieving the corresponding linguistic data from the corpus, and finally adjusting the beat and pitch of the synthesized voice according to the music scores provided by users to synthesize the vocal.

In the related art, the efficiency of synthesizing a vocal is low because it needs voice data of long time of users to build a corpus through the vocal synthesis technology and the process of calling the corpus to generate the voice takes a lot of time. In addition, because the corpus has a property of large volume, the user's demand for timbre customization can only be completed by replacing the whole corpus, process of which is cumbersome and time-consuming.

It should be noted that the information disclosed in the above background section is only used to enhance the understanding of the background of the present disclosure, so it may include information that does not form the prior art known to those skilled in the art.

SUMMARY

A purpose of the present disclosure is to provide a method and apparatus for synthesizing a customized timbre vocal, an electronic device and a storage medium, which at least to some extent overcomes the problem of low synthesis efficiency of the customized timbre vocal in related art.

Other properties and advantages of the present disclosure will become apparent through the following detailed description, or be learned in part by practice of the present disclosure.

According to one aspect of the present disclosure, there is provided a method for synthesizing a customized timbre vocal, including: training a first neural network by means of a speaker record sample to obtain a speaker recognition model, a training result output by the first neural network being a speaker vector sample; training a second neural network by means of an unaccompanied singing vocal sample and the speaker vector sample to obtain an unaccompanied singing synthesis model; inputting a speaker record to be synthesized into the speaker recognition model, and acquiring speaker information output by an intermediate hidden layer of the speaker recognition model; inputting unaccompanied singing music information to be synthesized and the speaker information into the unaccompanied singing synthesis model to obtain a synthesized customized timbre vocal.

In one embodiment of the present disclosure, training the first neural network by means of the speaker record sample to obtain a speaker recognition model includes: dividing the speaker record sample into a test record sample and a registered record sample, and inputting them into the first neural network; outputting a registered record feature through the first neural network based on the registered record sample, and, and performing a mean-pooling on the registered record feature to obtain a registered record vector; outputting a test record vector through the first neural network based on the test record sample; performing a cosine similarity calculation on the registered record vector and the test record vector to obtain a cosine similarity result; performing a parameter optimization on the first neural network through the cosine similarity result and a regression function until a loss value of the regression function is minimum; and determining the first neural network with an optimized parameter as the speaker recognition model.

In one embodiment of the present disclosure, the unaccompanied singing synthesis model includes a duration model, an acoustic model and a vocoder model, and training the second neural network by means of the unaccompanied singing vocal sample and the speaker vector sample to obtain the unaccompanied singing synthesis model, includes: analyzing a music score sample, a lyric sample and a phoneme duration sample in the unaccompanied singing vocal sample; and training the duration model by means of the speaker vector sample, the music score sample, the lyrics sample and the phoneme duration sample, an output result of the duration model being a duration prediction sample.

In one embodiment of the present disclosure, the unaccompanied singing synthesis model includes a duration model, an acoustic model and a vocoder model, and training the second neural network by means of the unaccompanied singing vocal sample and the speaker vector sample to obtain the unaccompanied singing synthesis model, includes: analyzing a music score sample, a lyric sample and a phoneme duration sample in the unaccompanied singing vocal sample; extracting a Mel spectrogram sample according to a song in the unaccompanied singing vocal sample; and training the acoustic model by means of the speaker vector sample, the phoneme duration sample, the music score sample, the lyrics sample and the Mel spectrogram sample, an output result of the acoustic model being a Mel spectrogram prediction sample.

In one embodiment of the present disclosure, the unaccompanied singing synthesis model includes a duration model, an acoustic model and a vocoder model, and training the second neural network by means of the unaccompanied singing vocal sample and the speaker vector sample to obtain the unaccompanied singing synthesis model, includes: extracting a Mel spectrogram sample according to a song in the unaccompanied singing vocal sample; and training the vocoder model by means of the Mel spectrogram sample, an output result of the vocoder model being an audio prediction sample.

In one embodiment of the present disclosure, inputting the unaccompanied singing music information to be synthesized and the speaker information into the unaccompanied singing synthesis model to obtain the synthesized customized timbre vocal includes: analyzing a music score to be synthesized and a lyric to be synthesized in the unaccompanied singing music information; inputting the speaker information, the music score to be synthesized and the lyric to be synthesized into the duration model, an output result of the duration model being a duration prediction result to be synthesized; inputting the duration prediction result, the speaker information, the music score to be synthesized and the lyric to be synthesized into the acoustic model, an output result of the acoustic model being a Mel spectrogram prediction result to be synthesized; and inputting the Mel spectrogram prediction result into the vocoder model, an output result of the vocoder model being the synthesized customized timbre vocal.

In one embodiment of the present disclosure, analyzing the music score to be synthesized and the lyric to be synthesized in the unaccompanied singing music information, includes: performing a text analysis and a feature extraction on music scores and lyrics in the unaccompanied singing music information to acquire the music score to be synthesized and the lyric to be synthesized.

In one embodiment of the present disclosure, inputting the duration prediction result, the speaker information, the music score to be synthesized and the lyric to be synthesized into the acoustic model, the output result of the acoustic model being a Mel spectrogram prediction result to be synthesized, includes: performing a frame-level extension on the duration prediction result, the music score to be synthesized and the lyric to be synthesized; and inputting a result of the frame-level extension and the speaker information into the acoustic model, an output result of the acoustic model being the Mel spectrogram prediction result to be synthesized.

According to another aspect of the present disclosure, there is provided an apparatus for synthesizing a customized timbre vocal, including: a first training module configured to train a first neural network by means of a speaker record sample to obtain a speaker recognition model, a training result output by the first neural network being a speaker vector sample; a second training module, configured to train a second neural network by means of an unaccompanied singing vocal sample and the speaker vector sample to obtain an unaccompanied singing synthesis model; a recognition module, configured to input a speaker record to be synthesized into the speaker recognition model, and acquire speaker information output by an intermediate hidden layer of the speaker recognition model; and a synthesis module, configured to input the unaccompanied singing music information to be synthesized and the speaker information into the unaccompanied singing synthesis model to obtain a synthesized customized timbre vocal.

According to yet another aspect of the present disclosure, there is provided an electronic device, including: a processor; and a memory configured to store executable instructions of the processor; where the processor is configured to execute the method for synthesizing the customized timbre vocal of any one of the above by executing the executable instructions.

According to yet another aspect of the present disclosure, there is provided a computer-readable storage medium, with a computer program stored thereon, and the computer program, when executed by a processor, realizes the method for synthesizing the customized timbre vocal of any one of the above.

According to the synthesis solution for a customized timbre vocal provided by the embodiments of the present disclosure, the first neural network is trained by means of the speaker record sample to obtain the speaker recognition model, the training result output by the first neural network is the speaker vector sample, and the second neural network is trained by means of the unaccompanied singing vocal sample and the speaker vector sample to obtain an unaccompanied singing synthesis model, so that the synthesis efficiency of the model is improved, and it is not necessary to collect a large number of record data to generate a corpus.

Furthermore, by inputting the speaker record to be synthesized into the speaker recognition model, acquiring the speaker information output from the intermediate hidden layer of the speaker recognition model, and inputting the unaccompanied singing music information to be synthesized and the speaker information into the unaccompanied singing synthesis model to obtain the synthesized customized timbre vocal, only a small amount of linguistic data is needed to train the user-customized timbre, and the effect of vocal synthesis is achieved by adjusting the rhythm and pitch of the synthesized voice, which reduces the time and training linguistic data needed in the process of synthesizing the customized timbre vocal and improves the synthesis efficiency of the customized timbre vocal.

It should be understood that both the foregoing general description and the following detailed description are exemplary and explanatory only and do not limit the present disclosure.

BRIEF DESCRIPTION OF THE DRAWINGS

The accompanying drawings herein are incorporated into and constitute a part of the present specification, illustrate embodiments consistent with the present disclosure, and are used in conjunction with the specification to explain the principles of the present disclosure. Obviously, the accompanying drawings in the following description are only some embodiments of the present disclosure, and other accompanying drawings can be obtained according to these accompanying drawings for the person skilled in the art without any creative work.

DETAILED DESCRIPTION

Figure 1:
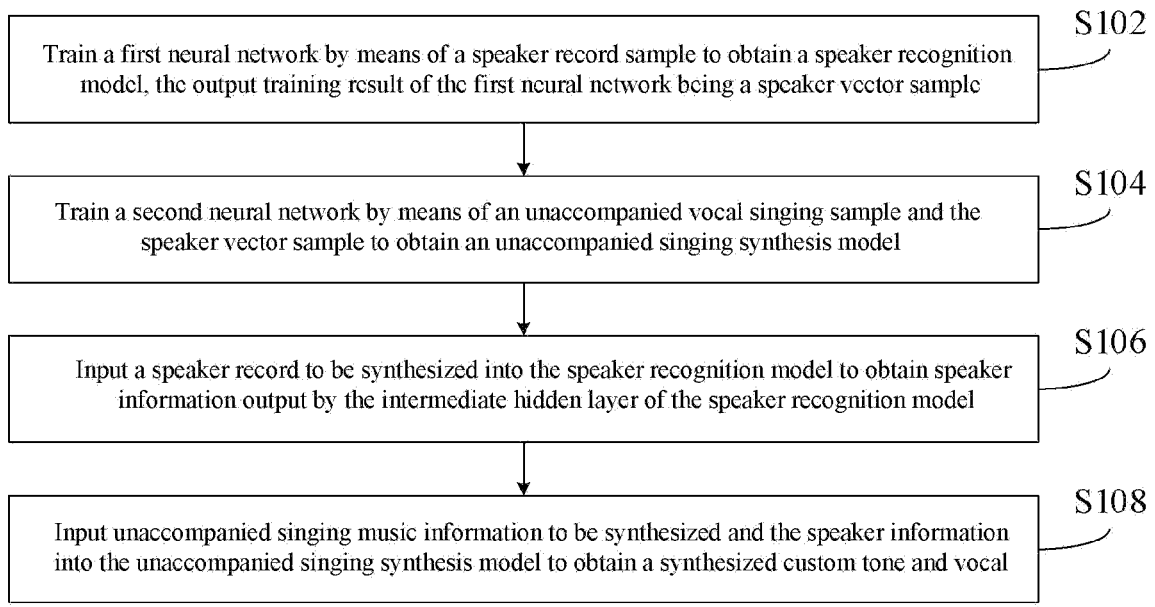
FIG. 1 shows a schematic diagram of a method for synthesizing a customized timbre vocal in an embodiment of the present disclosure.

Exemplary implementation manners will now be described more fully with reference to the accompanying drawings. However, the exemplary implementation manners can be implemented in various forms and should not be construed as being limited to the examples set forth herein. Rather, these implementation manners are provided so that this disclosure will be more thorough and complete, and will fully convey the concepts of the exemplary implementation manners to those skilled in the art. The described features, structures, or properties may be combined in any suitable manner in one or more implementation manners.

In addition, the accompanying drawings are merely schematic illustrations of the present disclosure and are not necessarily drawn to scale. The same reference numerals in the drawings indicate the same or similar parts, and thus repeated descriptions thereof will be omitted. Some block diagrams shown in the drawings are functional entities and do not necessarily have to correspond to physically or logically independent entities. These functional entities may be implemented in the form of software, or implemented in one or more hardware modules or integrated circuits, or implemented in different networks and/or processor apparatus and/or microcontroller apparatus.

According to the solutions provided by the present disclosure, the first neural network is trained by means of the speaker record sample to obtain a speaker recognition model, the training result output by the first neural network is the speaker vector sample, and the second neural network is trained by means of the unaccompanied singing vocal sample and the speaker vector sample to obtain the unaccompanied singing synthesis model, so that the synthesis efficiency of the model is improved, and it is not necessary to collect a large number of record data to generate a corpus.

Furthermore, by inputting the speaker record to be synthesized into the speaker recognition model, obtaining the speaker information output from the intermediate hidden layer of the speaker recognition model, and inputting the unaccompanied singing music information to be synthesized and the speaker information into the unaccompanied singing synthesis model to obtain the synthesized customized timbre vocal, the user-customized timbre can be trained and obtained by only a small amount of linguistic data, and the effect of vocal synthesis is achieved by adjusting the rhythm and pitch of the synthesized voice, which reduces the time and training linguistic data needed in the process of synthesizing the customized timbre vocal and improves the synthesis efficiency of the customized timbre vocal.

The above-mentioned synthesis solution of a customized timbre vocal may be realized through an interaction between a plurality of terminals and a server cluster.

The terminal may be a mobile phone, a game console, a tablet computer, an e-book reader, a smart glass, a moving picture experts group audio layer IV (MP4) player, a smart home device, an augmented reality (AR) device, a virtual reality (VR) device and other mobile terminals, or the terminal may also be a personal computer (PC), such as a laptop portable computer and a desktop computer, etc.

An application program for providing the synthesis of a customized timbre vocal may be installed in the terminal.

The terminal and the server cluster are connected through a communication network. Optionally, the communication network is a wired network or a wireless network.

The server cluster is a server, or consists of several servers, or a virtualization platform, or a cloud computing service center. The server cluster is used to provide a background service for the application that provides the synthesis of a customized timbre vocal. Optionally, the server cluster undertakes the primary computing work, and the terminal undertakes the secondary computing work. Alternatively, the server cluster undertakes the secondary computing work, and the terminal undertakes the primary computing work. Alternatively, a distributed computing architecture is adopted for collaborative computing between the terminal and server cluster.

Optionally, clients of applications installed on different terminals are the same, or the clients of applications installed on two terminals are clients of the same type of application on different control system platforms. Based on the different terminal platforms, the specific form of the client of the application may also be different. For example, the client of the application may be a mobile phone client, a PC client or a global wide area network client.

Those skilled in the art can know that the number of the above terminals may be more or less. For example, there may be only one terminal, or dozens or hundreds of terminals, or more. The embodiments of the present disclosure do not limit the number and the device type of the terminals.

Optionally, the system may also include a management device, which is connected with the server cluster through a communication network. Optionally, the communication network is a wired network or a wireless network.

Optionally, the above-mentioned wireless network or wired network uses standard communication technologies and/or protocols. The network is usually the Internet, but it can also be any network, including but not limited to any combination of a local area network (LAN), a metropolitan area network (MAN), a wide area network (WAN), a mobile, a wired or wireless network, a private network or a virtual private network. In some embodiments, technologies and/or formats including a hyper text mark-up language (HTML), an extensible markup language (XML), etc., are used to represent data exchanged over the network. In addition, conventional encryption technologies such as a secure socket layer (SSL), a transport layer security (TLS), a virtual private network (VPN) and an Internet protocol security (IPsec) can also be used to encrypt all or some links. In some other embodiments, customized and/or dedicated data communication technologies can also be used to replace or supplement the above data communication technologies.

In the following, individual steps of the method for synthesizing a customized timbre vocal in this exemplary implementation manner will be described in more detail in combination with the accompanying drawings and the embodiments.

FIG. 1 shows a flowchart of a method for synthesizing a customized timbre vocal in an embodiment of the present disclosure. The method provided by the embodiment of the present disclosure can be executed by any electronic device with computing processing capability.

As shown in FIG. 1, the electronic device executes the method for synthesizing a customized timbre vocal, including the following steps.

In step S102: a first neural network is trained by means of a speaker record sample to obtain a speaker recognition model, and a training result output by the first neural network is a speaker vector sample.

In step S104: a second neural network is trained by means of an unaccompanied singing vocal sample and the speaker vector sample to obtain an unaccompanied singing synthesis model.

In step S106: a speaker record to be synthesized is input into the speaker recognition model, and speaker information output by an intermediate hidden layer of the speaker recognition model is acquired.

In step S108: unaccompanied singing music information to be synthesized and the speaker information are input into the unaccompanied singing synthesis model to obtain a synthesized customized timbre vocal.

In one embodiment of the present disclosure, the first neural network is trained by means of the speaker record sample to obtain a speaker recognition model, the training result output by the first neural network is the speaker vector sample, and the second neural network is trained by means of the unaccompanied singing vocal sample and the speaker vector sample to obtain the unaccompanied singing synthesis model, so that the synthesis efficiency of the model is improved, and it is not necessary to collect a large number of record data to generate a corpus.

Furthermore, by inputting the speaker record to be synthesized into the speaker recognition model, obtaining the speaker information output from the intermediate hidden layer of the speaker recognition model, and inputting the unaccompanied singing music information to be synthesized and the speaker information into the unaccompanied singing synthesis model to obtain the synthesized customized timbre vocal, only a small amount of linguistic data is needed to train the user-customized timbre, and the effect of vocal synthesis is achieved by adjusting the rhythm and pitch of the synthesized voice, which reduces the time and training linguistic data needed in the process of synthesizing the customized timbre vocal and improves the synthesis efficiency of the customized timbre vocal.

Figure 2:
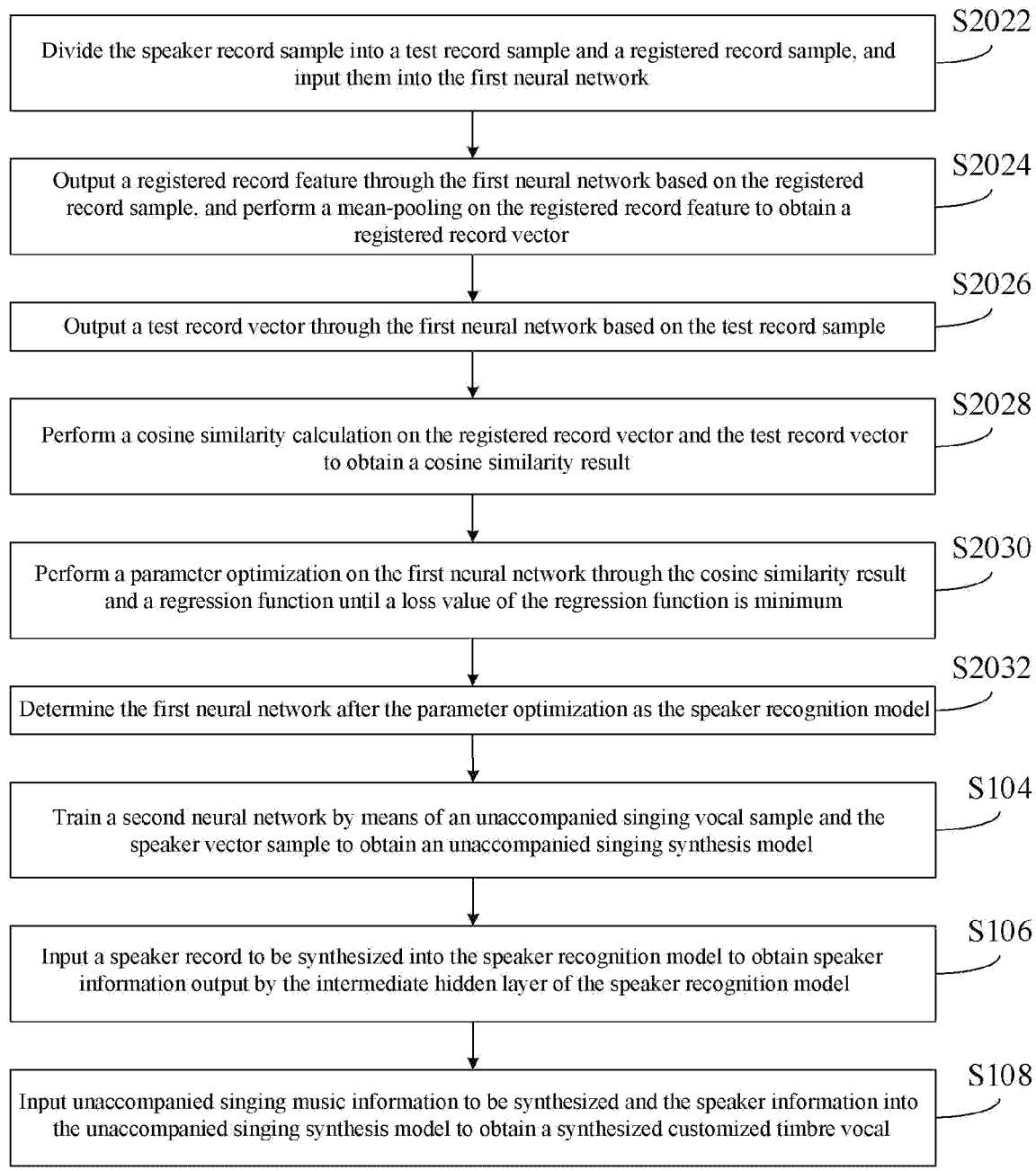
FIG. 2 shows a flowchart of another method for synthesizing a customized timbre vocal in an embodiment of the present disclosure.

Based on the steps shown in FIG. 1, as shown in FIG. 2, training the first neural network by means of the speaker record sample to obtain the speaker recognition model, includes the following steps.

In step S2022: the speaker record sample is divided into a test record sample and a registered record sample, and the test record sample and the registered record sample are input into the first neural network.

in step S2024: a registered record feature is output through the first neural network based on the registered record sample, and a mean-pooling is performed on the registered record feature to obtain a registered record vector.

In one embodiment of the present disclosure, the forward propagation of the mean-pooling processing is to average the values in a block for pooling, and the reverse propagation process is to divide the gradient of one element into n equal parts and distribute them to the previous layer, thus ensuring that the sum of gradients (residuals) before and after pooling remains unchanged. The mean-pooling processing can reduce the error of variance of estimated values caused by the limited neighborhood size and retain more feature information.

In step S2026: a test record vector is output through the first neural network based on the test record sample.

In step S2028: a cosine similarity calculation is performed on the registered record vector and the test record vector to obtain a cosine similarity result.

In step S2030: a parameter optimization is performed on the first neural network through the cosine similarity result and a regression function until a loss value of the regression function is minimum.

In step S2032: the first neural network after the parameter optimization is determined as the speaker recognition model.

In one embodiment of the present disclosure, the parameter optimization is performed on the first neural network through the cosine similarity result and the regression function until the loss value of the regression function is minimum, so as to obtain the speaker recognition model capable of recognizing the speaker, and the recognition can be completed only based on a speaker record of a few seconds.

Figure 3:
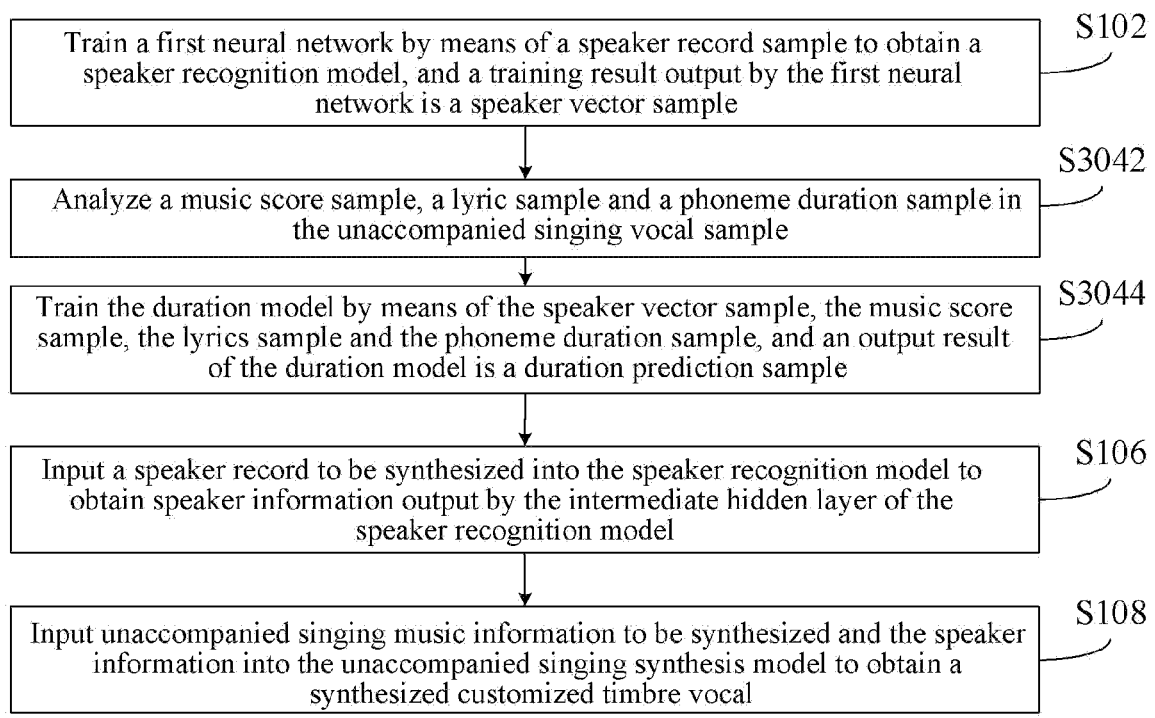
FIG. 3 shows a flowchart of yet another method for synthesizing a customized timbre vocal in an embodiment of the present disclosure.

Based on the steps shown in FIG. 1, as shown in FIG. 3, the unaccompanied singing synthesis model includes a duration model, an acoustic model and a vocoder model, and training the second neural network by means of the unaccompanied singing vocal sample and the speaker vector sample to obtain the unaccompanied singing synthesis model, includes the following steps.

In step S3042: a music score sample, a lyric sample and a phoneme duration sample in the unaccompanied singing vocal sample are analyzed.

In step S3044: the duration model is trained by means of the speaker vector sample, the music score sample, the lyrics sample and the phoneme duration sample, and an output result of the duration model is a duration prediction sample.

In one embodiment of the present disclosure, the duration model is trained by means of the speaker vector sample, music score sample, lyrics sample and phoneme duration sample, and the output result of the duration model is the duration prediction sample, so as to realize a duration prediction result of the synthesized unaccompanied singing song, and the duration prediction result is used as an input variable of the acoustic model.

Figure 4:
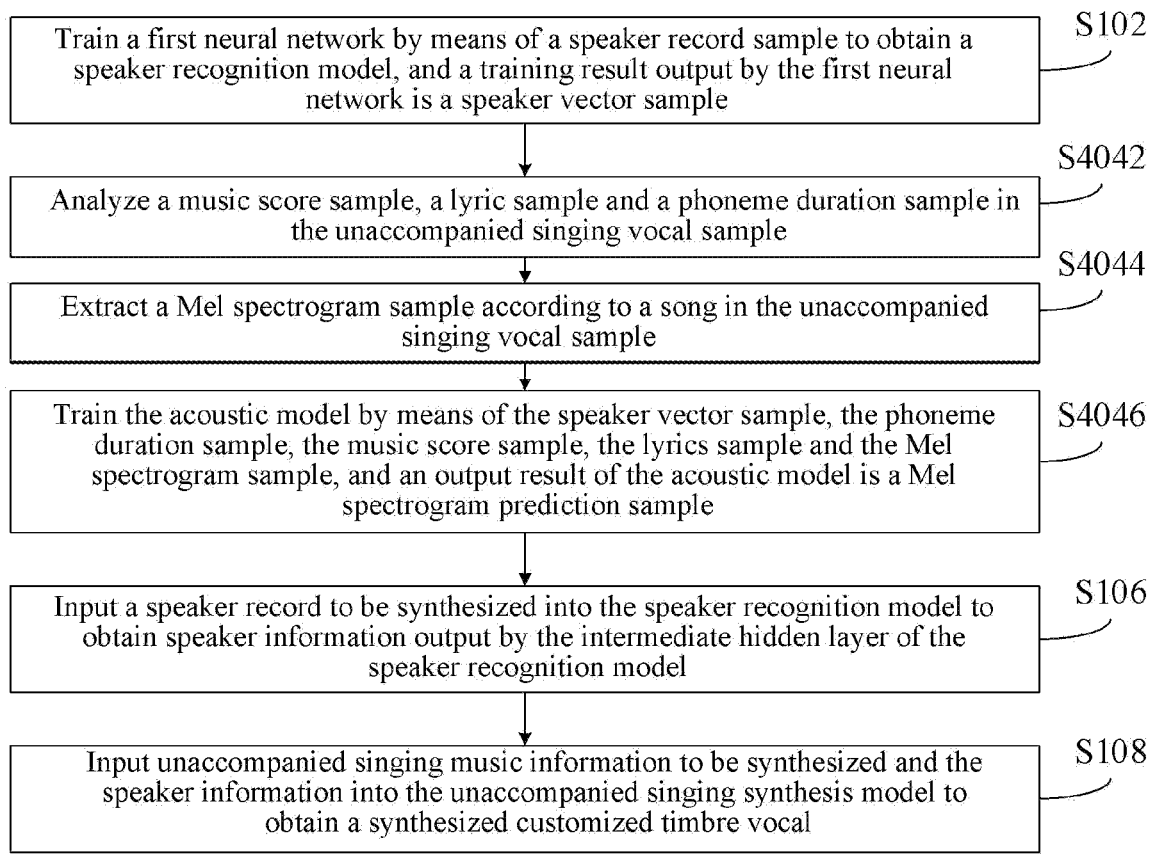
FIG. 4 shows a flowchart of yet another method for synthesizing a customized timbre vocal in an embodiment of the present disclosure.

Based on the steps shown in FIG. 1, as shown in FIG. 4, the unaccompanied singing synthesis model includes a duration model, an acoustic model and a vocoder model, and training the second neural network by means of the unaccompanied singing vocal sample and the speaker vector sample to obtain the unaccompanied singing synthesis model includes the following steps.

In step S4042: a music score sample, a lyric sample and a phoneme duration sample in the unaccompanied singing vocal sample are analyzed.

In step S4044: a Mel spectrogram sample is extracted according to a song in the unaccompanied singing vocal sample.

In step S4046: the acoustic model is trained by means of the speaker vector sample, the phoneme duration sample, the music score sample, the lyrics sample and the Mel spectrogram sample, and an output result of the acoustic model is a Mel spectrogram prediction sample.

In one embodiment of the present disclosure, the acoustic model is trained by means of the speaker vector sample, phoneme duration sample, music score sample, lyrics sample and Mel spectrogram sample, and the output result of the acoustic model is the Mel spectrogram prediction sample, so as to obtain a sound feature of appropriate size. The Mel spectrogram is used to simulate the perception of human ears to sounds of various frequencies, that is, the Mel spectrogram is used to strengthen the low-frequency part and weaken the high-frequency part, so as to make the unaccompanied singing synthesized vocal closer to the natural person's vocal.

Figure 5:
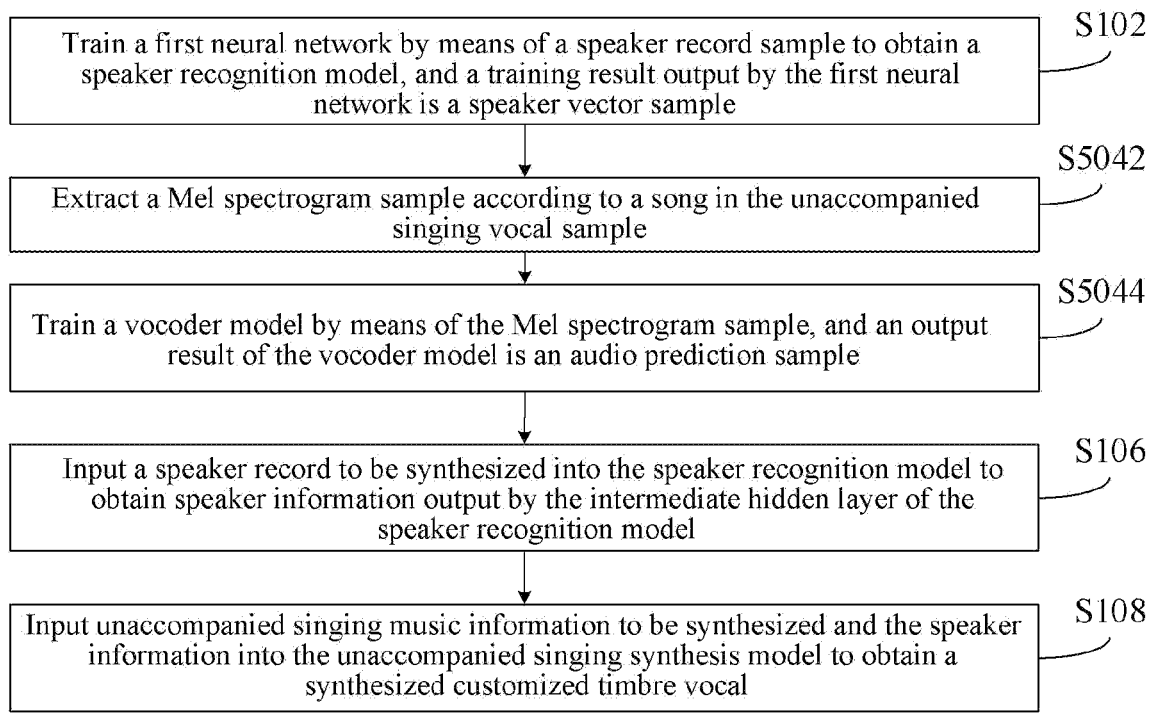
FIG. 5 shows a flowchart of yet another method for synthesizing a customized timbre vocal in an embodiment of the present disclosure.

Based on the steps shown in FIG. 1, as shown in FIG. 5, the unaccompanied singing synthesis model includes a duration model, an acoustic model and a vocoder model, and training the second neural network by means of the unaccompanied singing vocal sample and the speaker vector sample to obtain the unaccompanied singing synthesis model includes the following steps.

In step S5042: a Mel spectrogram sample is extracted according to a song in the unaccompanied singing vocal sample.

In step S5044: the vocoder model is trained by means of the Mel spectrogram sample, and an output result of the vocoder model is an audio prediction sample.

In one embodiment of the present disclosure, the vocoder model is trained by means of the Mel spectrogram sample, and the output result of the vocoder model is the audio prediction sample, so as to obtain the audio prediction sample that conforms to the speaker timbre.

Figure 6:
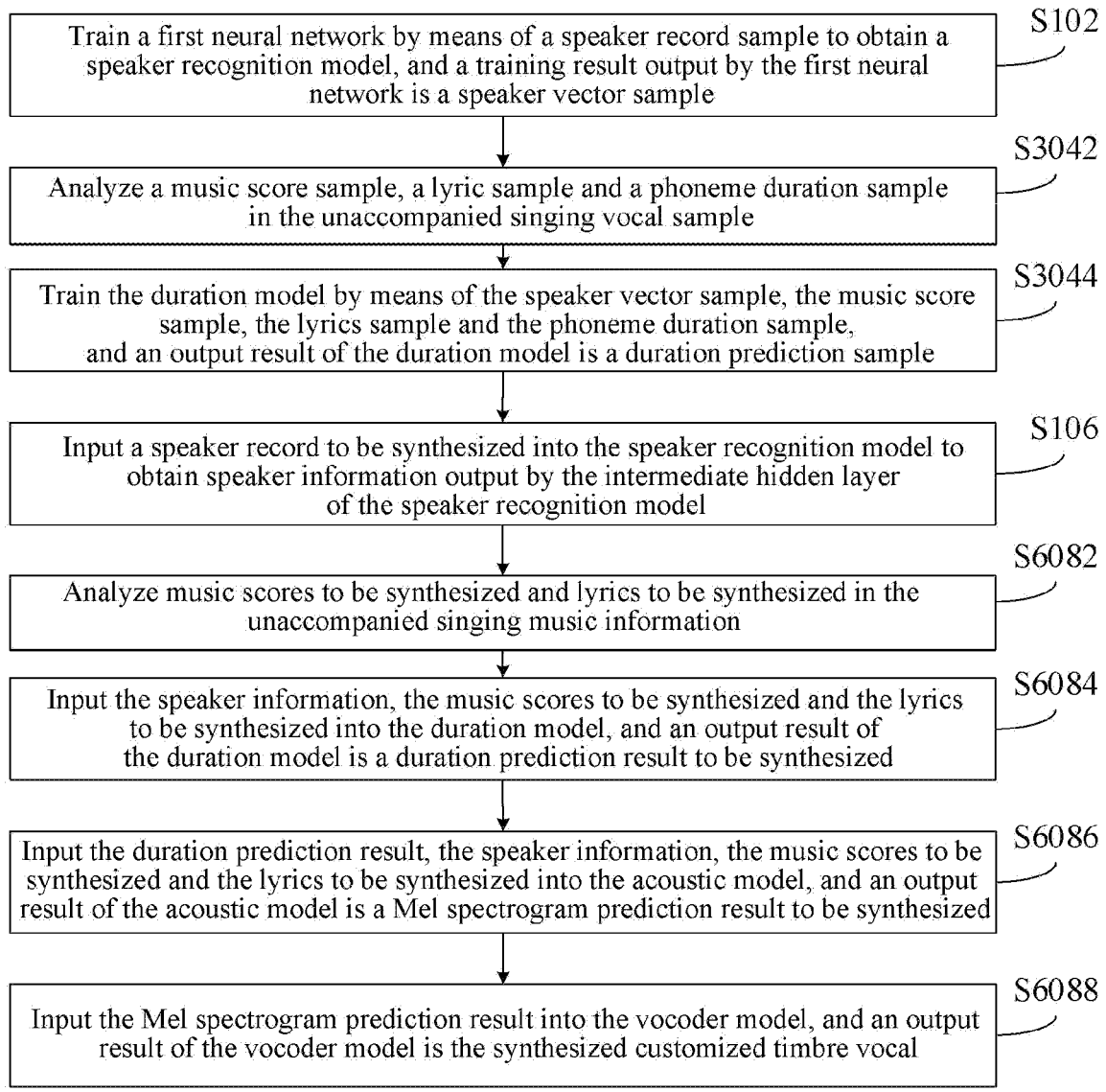
FIG. 6 shows a flowchart of yet another method for synthesizing a customized timbre vocal in an embodiment of the present disclosure.

Based on the steps shown in FIG. 1 and FIG. 3, as shown in FIG. 6, inputting the unaccompanied singing music information to be synthesized and the speaker information into the unaccompanied singing synthesis model to obtain the synthesized customized timbre vocal includes the following steps.

In step S6082: a music score to be synthesized and a lyric to be synthesized in the unaccompanied singing music information are analyzed.

In step S6084: the speaker information, the music score to be synthesized and the lyric to be synthesized are input into the duration model, and an output result of the duration model is a duration prediction result to be synthesized.

In step S6086: the duration prediction result, the speaker information, the music score to be synthesized and the lyric to be synthesized are input into the acoustic model, and an output result of the acoustic model is a Mel spectrogram prediction result to be synthesized.

In step S6088: the Mel spectrogram prediction result is input into the vocoder model, and an output result of the vocoder model is the synthesized customized timbre vocal.

In one embodiment of the present disclosure, in the process of synthesizing a customized timbre vocal, the speaker is determined by the speaker recognition model, and then the customized timbre vocal conforming to the speaker timbre is obtained according to the speaker, the music score to be synthesized and the lyric to be synthesized by the duration model, the acoustic model and the vocoder model in turn.

Figure 7:
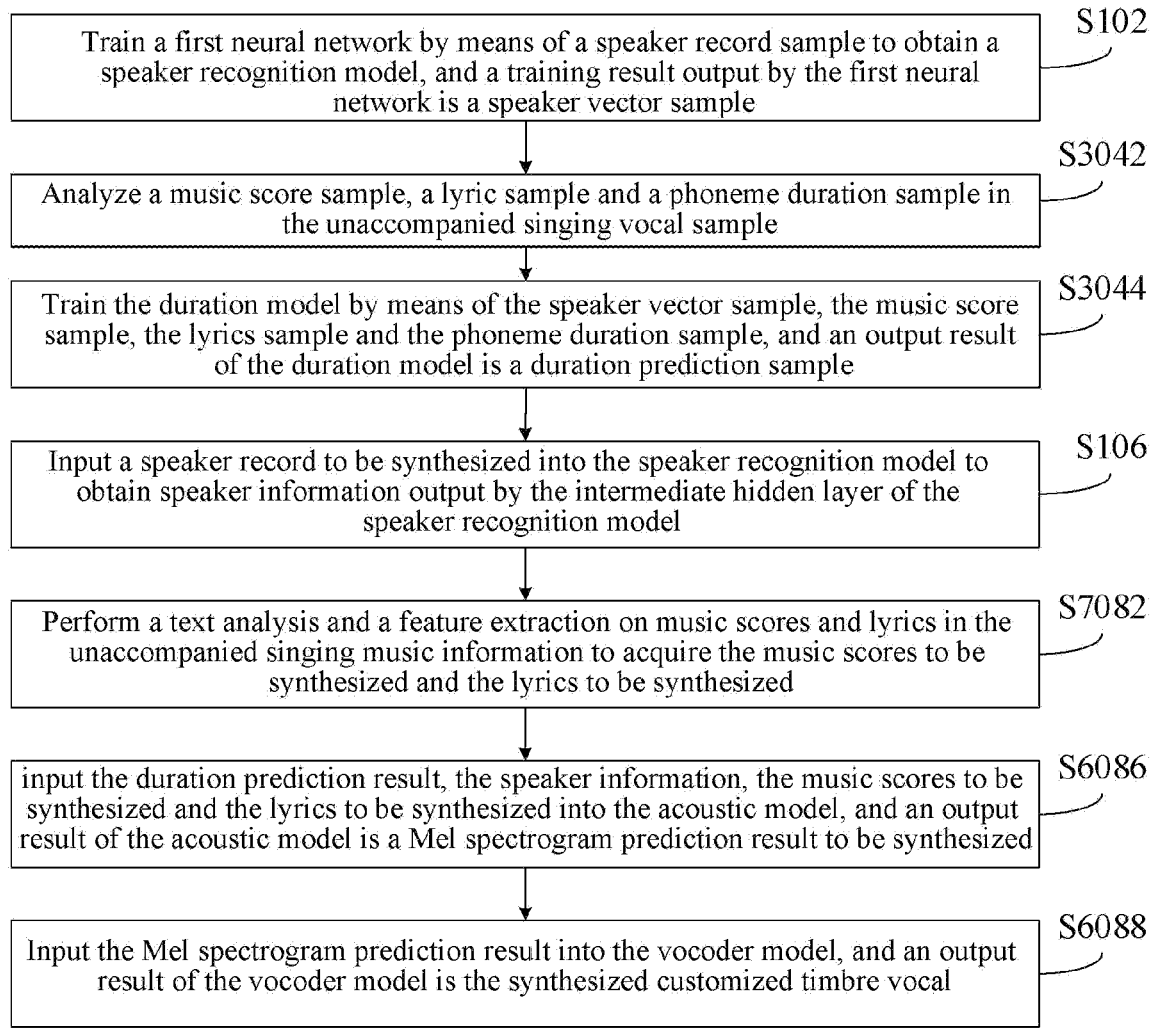
FIG. 7 shows a flowchart of yet another method for synthesizing a customized timbre vocal in an embodiment of the present disclosure.

Based on the steps shown in FIG. 1 and FIG. 3, as shown in FIG. 7, analyzing the music score to be synthesized and the lyric to be synthesized in the unaccompanied singing music information includes the following steps.

In step S7082: a text analysis and a feature extraction are performed on music score and lyrics in the unaccompanied singing music information to acquire the music score to be synthesized and the lyric to be synthesized.

In one embodiment of the present disclosure, the text analysis and feature extraction are performed on the music scores and lyrics in the unaccompanied singing music information to acquire the music score to be synthesized and the lyric to be synthesized, so that the lyric to be synthesized is more in line with the speaker's enunciation characteristics, and the music score to be synthesized is more in line with the speaker's unaccompanied singing timbre.

Figure 8:
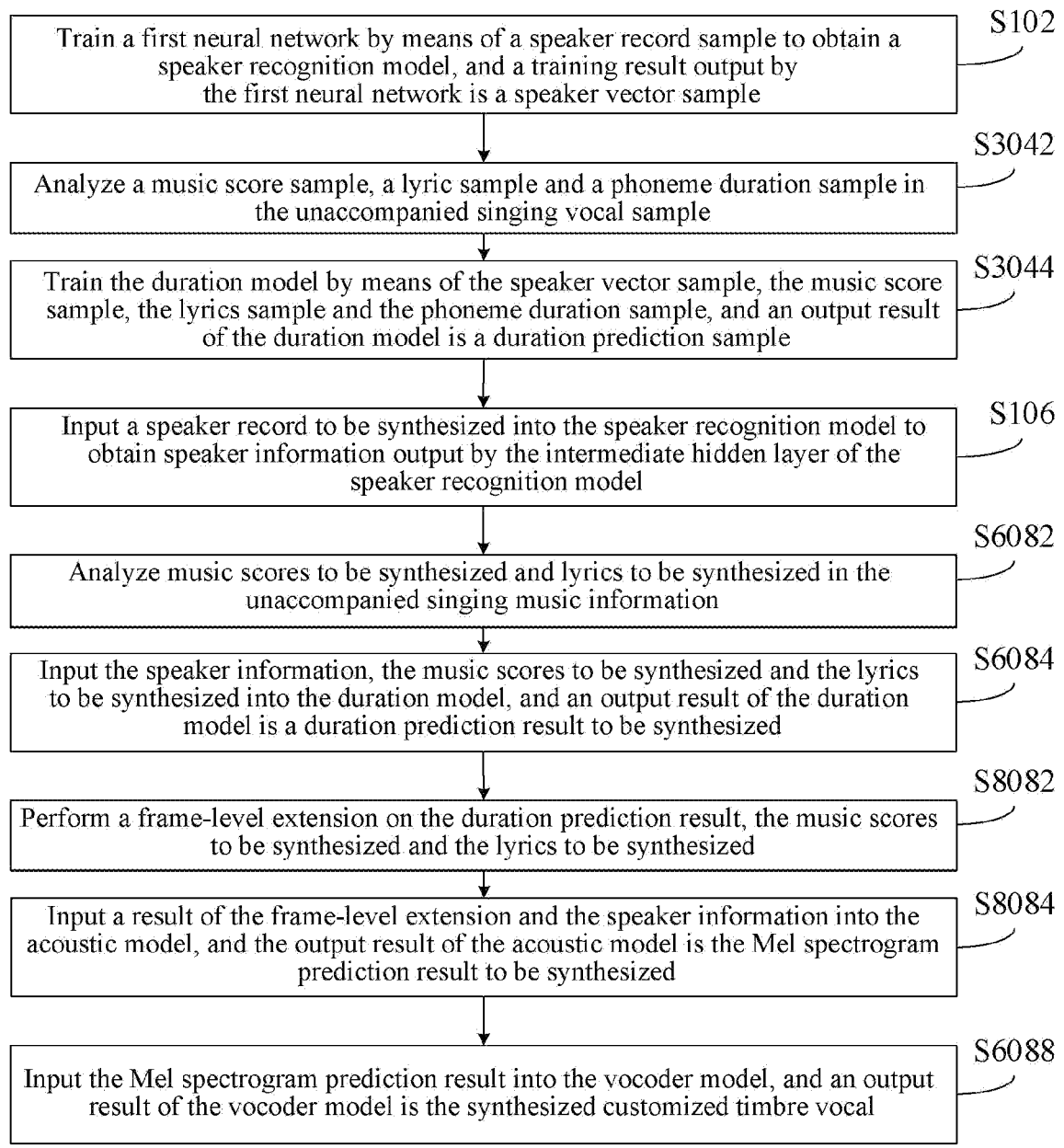
FIG. 8 shows a flowchart of yet another method for synthesizing a customized timbre vocal in an embodiment of the present disclosure.

Based on the steps shown in FIG. 1 and FIG. 3, as shown in FIG. 8, inputting the duration prediction result, the speaker information, the music score to be synthesized and the lyric to be synthesized into the acoustic model, the output result of the acoustic model being a Mel spectrogram prediction result to be synthesized, includes the following steps.

In step S8082: a frame-level extension is performed on the duration prediction result, the music score to be synthesized and the lyric to be synthesized.

In step S8084: a result of the frame-level extension and the speaker information are input into the acoustic model, and the output result of the acoustic model is the Mel spectrogram prediction result to be synthesized.

In the following, with reference to FIG. 9, a schematic diagram of a synthesis solution of a customized timbre vocal according to this implementation manner of the present disclosure will be described. The training stage 900 of the synthesis solution of a customized timbre vocal shown in FIG. 9 is only an example, and should not bring any limitation to the function and application scope of the embodiments of the present disclosure.

Figure 9:
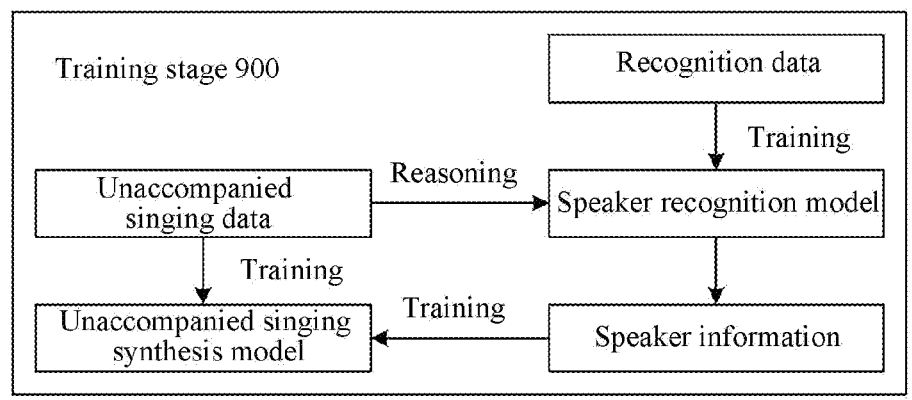
FIG. 9 shows a flowchart of yet another method for synthesizing a customized timbre vocal in an embodiment of the present disclosure.

As shown in FIG. 9, the training stage 900 of the synthesis solution of a customized timbre vocal includes: inputting recognition data into a speaker recognition model for training; an output of the speaker recognition model being speaker information; inputting unaccompanied singing data and the speaker information into the unaccompanied singing synthesis model for training.

In the following, with reference to FIG. 10, a schematic diagram of a synthesis solution of a customized timbre vocal according to this implementation manner of the present disclosure will be described. The synthesis stage 1000 of the synthesis solution of a customized timbre vocal shown in FIG. 10 is only an example, and should not bring any limitation to the function and application scope of the embodiment of the present disclosure.

Figure 10:
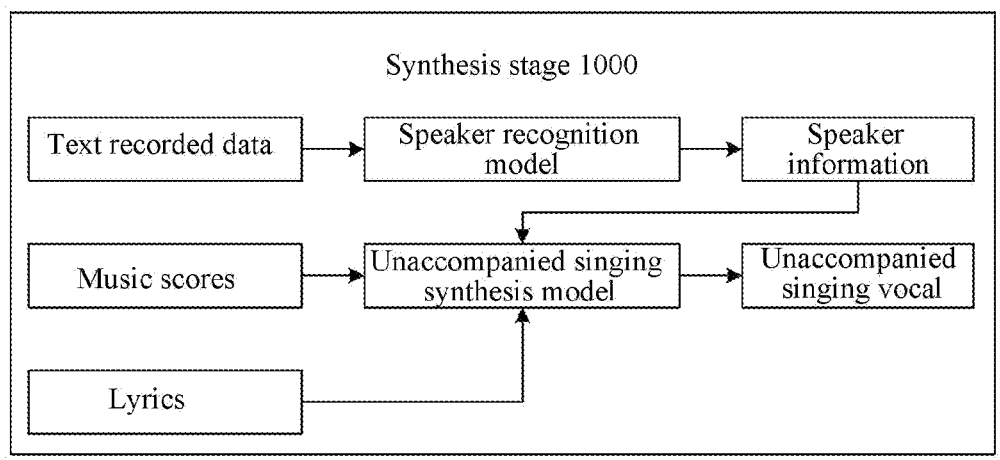
FIG. 10 shows a flowchart of yet another method for synthesizing a customized timbre vocal in an embodiment of the present disclosure.

As shown in FIG. 10, the synthesis stage 1000 of the synthesis solution of a customized timbre vocal includes: inputting text recorded data into a speaker recognition model to obtain speaker information; inputting the speaker information, a music score and a lyric into the unaccompanied singing synthesis model to obtain an unaccompanied singing vocal.

In the following, with reference to FIG. 11, a schematic diagram of a synthesis solution of a customized timbre vocal according to this implementation manner of the present disclosure will be described. The speaker recognition model 1100 of the synthesis solution of a customized timbre vocal shown in FIG. 11 is only an example, and should not bring any limitation to the function and application scope of the embodiment of the present disclosure.

Figure 11:
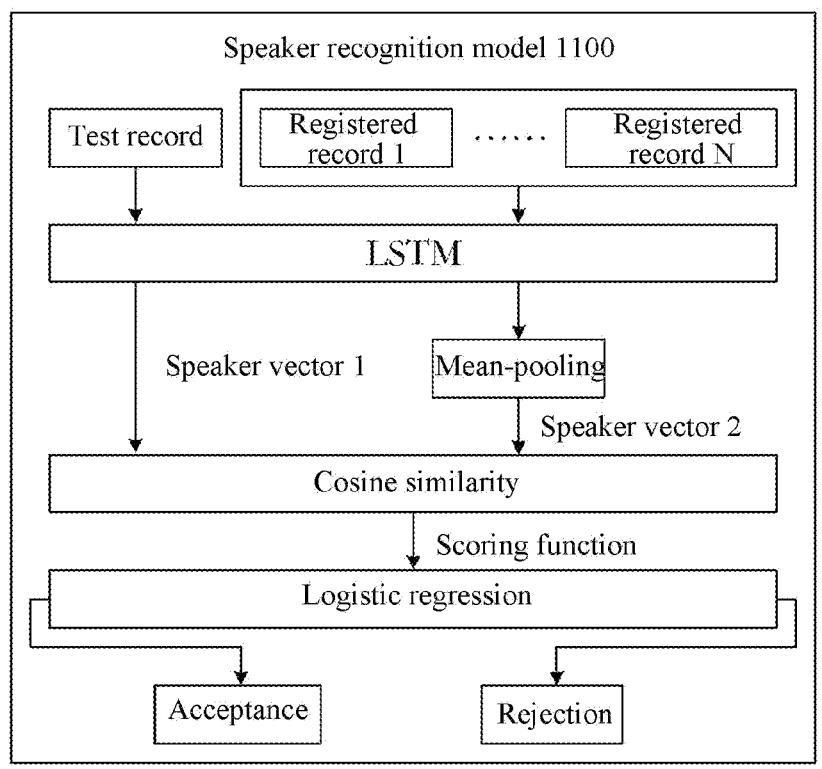
FIG. 11 shows a flowchart of yet another method for synthesizing a customized timbre vocal in an embodiment of the present disclosure.

As shown in FIG. 11, the execution stage of the speaker recognition model 1100 of the synthesis solution of a customized timbre vocal includes the following steps.

(1) A test record, registered record 1, . . . registered record N are input into a long short-term memory (LSTM), where N is an integer greater than 1. The LSTM is a long short-term memory network, which is a type of time recursive neural network suitable for processing and predicting important events with relatively long intervals and delays in time series. The test record is processed by the LSTM, to output a speaker vector 1. The registered records are processed by LSTM to output a vector, and a mean-pooling is performed on the vector to obtain a speaker vector 2.

(2) A cosine similarity calculation is performed on the speaker vector 1 and the speaker vector 2, and a scoring function is calculated.

(3) A result of the scoring function is determined to be acceptance or rejection through logistic regression processing.

In the following, with reference to FIG. 12, a schematic diagram of a synthesis solution of a customized timbre vocal according to this implementation manner of the present disclosure will be described. The unaccompanied singing synthesis model 1200 of the synthesis solution of a customized timbre vocal shown in FIG. 12 is only an example, and should not bring any limitation to the function and application scope of the embodiment of the present disclosure.

Figure 12:
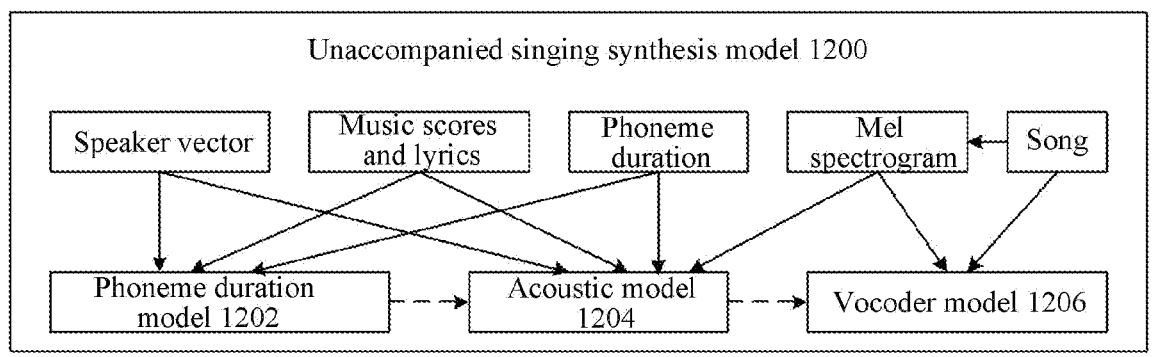
FIG. 12 shows a flowchart of yet another method for synthesizing a customized timbre vocal in an embodiment of the present disclosure.

As shown in FIG. 12, the unaccompanied singing synthesis model 1200 of the synthesis solution of a customized timbre vocal includes a phoneme duration model 1202, an acoustic model 1204 and a vocoder model 1206, and the training process of each module can be independently performed as follows.

(1) The speaker vector, music scores, lyrics and phoneme duration are input into the phoneme duration model 1202 for training.

(2) The speaker vector, music scores and lyrics, phoneme duration and Mel spectrogram are input into the acoustic model 1204 for training.

(3) The Mel spectrogram and a song are input into the vocoder model 1206 for training.

Specifically, the synthesis solution of a customized timbre vocal includes a speaker recognition model and an unaccompanied singing synthesis model. The unaccompanied singing synthesis model contains a training process and a reasoning process, and the unaccompanied singing synthesis model contains a phoneme duration model, an acoustic model and a neural network vocoder model.

For example, the phoneme duration model may be a deep neural network (DNN) model composed of three fully connected layers, with the music scores and lyrics as input and the phoneme duration as output. When predicting, we only know the music scores.

For example, the speaker vector is also added into the phoneme duration model during training, which is used to obtain different phoneme duration models according to different speakers.

For example, the input of the acoustic model is the music scores and phoneme duration, the output is the Mel spectrogram, and the speaker vector is also input into the acoustic model.

For example, the input of the vocoder model is the Mel spectrogram and the output is an audio. One possible way to realize the acoustic model is a deep neural network model composed of three layers of LSTM, or a complex model with an attention mechanism.

For example, the vocoder model may adopt an improving neural speech synthesis through linear prediction (LPCNet) vocoder.

For example, in the reasoning process, the music scores and lyrics, and the speaker vector of the singer are known, and then the synthesized song can be output using the phoneme duration model, acoustic model and vocoder model obtained in the training process.

For example, in the process of training and reasoning, it is necessary to analyze the text, extract phonemes, word segmentation and other features from the music scores and lyrics, and then predict the phoneme duration or train the phoneme duration model.

In the following, with reference to FIG. 13, a schematic diagram of a synthesis solution of a customized timbre vocal according to this implementation manner of the present disclosure will be described. The synthesis solution of a customized timbre vocal shown in FIG. 13 is only an example, and should not bring any limitation to the function and application scope of the embodiment of the present disclosure.

Figure 13:
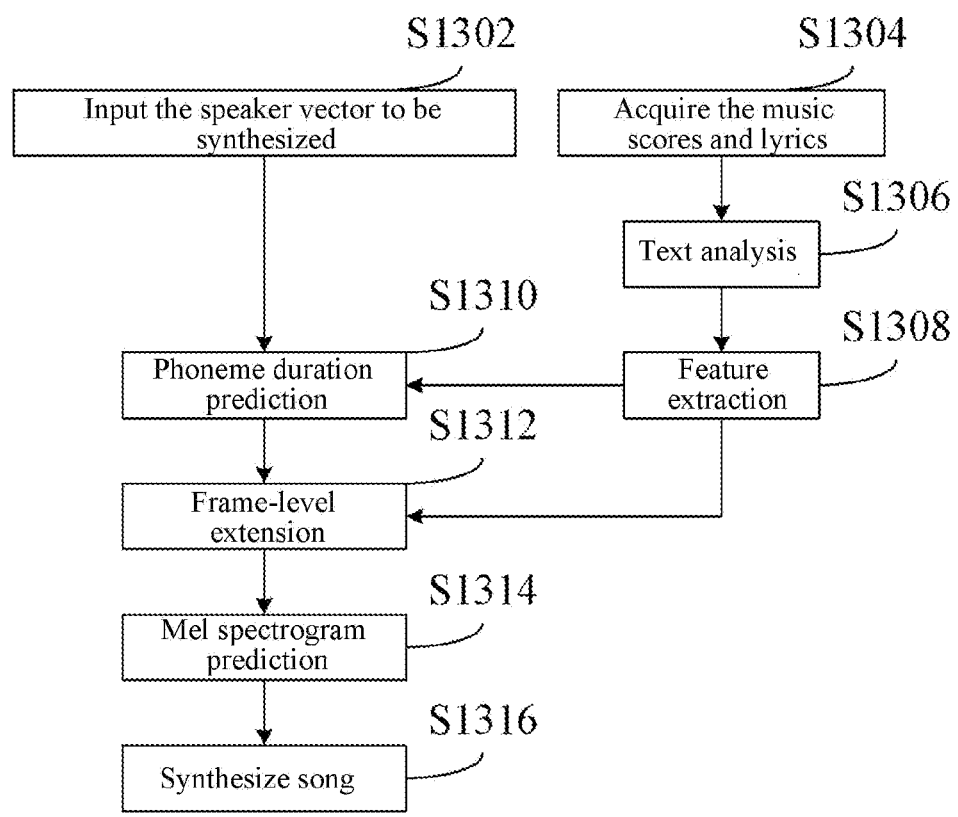
FIG. 13 shows a flowchart of yet another method for synthesizing a customized timbre vocal in an embodiment of the present disclosure.

As shown in FIG. 13, the execution steps of the synthesis solution of a customized timbre vocal include the following steps.

In step S1302: the speaker vector to be synthesized is input.

In step S1304: the music scores and lyrics are acquired.

In step S1306: a text analysis is performed.

In step S1308: a feature extraction is performed.

In step S1310: a phoneme duration prediction is performed.

In step S1312: a frame-level extension is performed.

In step S1314: a Mel spectrogram prediction is performed.

In step S1316, a song is synthesized.

The speaker vector is extracted by using deep neural network according to the acoustic feature of the speaker. Through information of the speaker, the timbre of the synthesized unaccompanied singing voice can be controlled. The present disclosure trains an unaccompanied singing synthesis model, which is obtained by training on a large number of speaker-recorded reading and unaccompanied singing vocal data sets. When a new speaker needs to synthesize a vocal of unaccompanied singing, it is only needed to record a small amount of reading linguistic data of the speaker, and extract the speaker vector of the speaker, and then input the speaker vector into the unaccompanied singing synthesis model. By combining the music score and lyrics, through the reasoning process of the unaccompanied singing synthesis model, the unaccompanied singing voice (i.e., the customized synthesized vocal) of the speaker is generated.

For example, an unaccompanied singing data set containing multi-timbre and multi-vocal can be constructed to train a basic model that can synthesize an unaccompanied singing sound by providing music scores and lyrics. In addition, the data set needs to contain a part of singer record data of a specified text.

For example, a text-related speaker recognition model may be trained, and a result of the intermediate hidden layer of the model is taken and defined as the speaker vector.

For example, the designated text of the singer may be recorded and sent to the speaker recognition model to obtain the speaker vector, and then the speaker vector is used as a part of the unaccompanied singing vocal model, and an unaccompanied singing synthesis model is trained by means of a large number of unaccompanied singing data sets of multi-timbre and multi-vocal, and the unaccompanied singing synthesis model contains the identity information of the singer.

In the following, with reference to FIG. 14, an apparatus for synthesizing a customized timbre vocal 1400 according to this implementation manner of the present disclosure will be described. The apparatus for synthesizing a customized timbre vocal 1400 shown in FIG. 14 is only an example, and should not bring any limitation to the function and application scope of the embodiment of the present disclosure.

Figure 14:
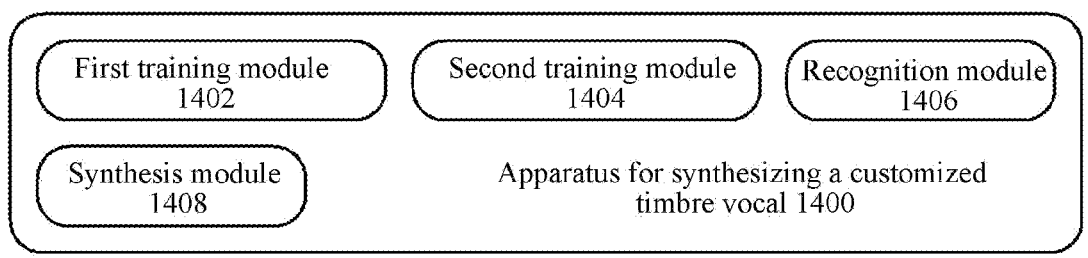
FIG. 14 shows a schematic diagram of an apparatus for synthesizing a customized timbre vocal in an embodiment of the present disclosure.

As shown in FIG. 14, the apparatus for synthesizing a customized timbre vocal 1400 is represented in the form of a hardware module. Components of the apparatus for synthesizing a customized timbre vocal 1400 may include, but are not limited to, a first training module 1402, a second training module 1404, a recognition module 1406 and a synthesis module 1408.

The first training module 1402 is configured to train a first neural network by means of a speaker record sample to obtain a speaker recognition model, and a training result output by the first neural network is a speaker vector sample.

The second training module 1404 is configured to train a second neural network by means of the unaccompanied singing vocal sample and the speaker vector sample to obtain an unaccompanied singing synthesis model.

The recognition module 1406 is configured to input a speaker record to be synthesized into the speaker recognition model, and acquire speaker information output by an intermediate hidden layer of the speaker recognition model.

The synthesis module 1408 is configured to input the unaccompanied singing music information to be synthesized and the speaker information into the unaccompanied singing synthesis model to obtain a synthesized customized timbre vocal.

In the following, with reference to FIG. 15, an electronic device 1500 according to this implementation manner of the present disclosure will be described. The electronic device 1500 shown in FIG. 15 is just an example, and should not bring any limitation to the function and application scope of the embodiment of the present disclosure.

Figure 15:
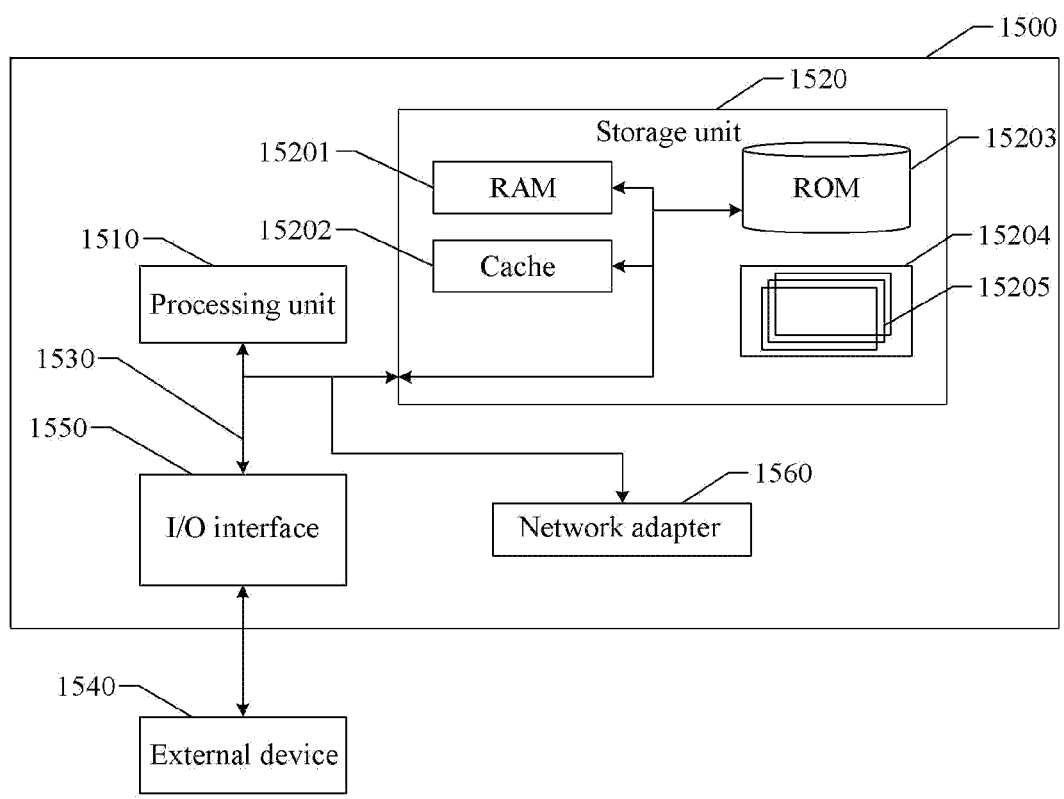
FIG. 15 shows a schematic diagram of an electronic device in an embodiment of the present disclosure.

As shown in FIG. 15, the electronic device 1500 is represented in the form of a general-purpose computing device. Components of the electronic device 1500 may include, but are not limited to, the above-mentioned at least one processing unit 1510, the above-mentioned at least one storage unit 1520, and a bus 1530 connecting different system components (including the storage unit 1520 and the processing unit 1510).

The storage unit stores a program code that can be executed by the processing unit 1510, so that the processing unit 1510 performs the steps according to various exemplary implementation manners of the present disclosure described in the above-mentioned "exemplary method" section of this specification. For example, the processing unit 1510 may perform the steps defined in the method for synthesizing a customized timbre vocal of the present disclosure.

The storage unit 1520 may include a readable medium in the form of a volatile storage unit, such as a random access storage unit (RAM) 15201 and/or a cache storage unit 15202, and may further include a read-only storage unit (ROM) 15203.

The storage unit 1520 may also include programs/utilities 15204 of a set of (at least one) program modules 15205, such program modules 15205 include, but are not limited to, an operating system, one or more application programs, other program modules and program data, and each or some combination of these examples may include the implementation of a network environment.

The bus 1530 may represent one or more of several bus structures, including a memory cell bus or a memory cell controller, a peripheral bus, a graphics acceleration port, a processing unit, or a local bus using any of a variety of bus structures.

The electronic device 1500 may also communicate with one or more external devices 1540 (e.g., a keyboard, a pointing device, a Bluetooth device, etc.), and may also communicate with one or more device that enable users to interact with the electronic device, and/or communicate with any device that enables the electronic device 1500 to communicate with one or more other computing devices (e.g., a router, a modem, etc.). This communication may be performed through an input/output (I/O) interface 1550. Moreover, the electronic device 1500 may also communicate with one or more networks (e.g., a local area network (LAN), wide area network (WAN) and/or public networks, such as the Internet) through the network adapter 1560. The network adapter 1560 communicates with other modules of the electronic device 1500 through the bus 1530. It should be understood that although not shown in the accompanying drawings, other hardware and/or software modules may be used in conjunction with the electronic device, including but not limited to: a microcode, a device driver, a redundant processing unit, an external disk drive array, an RA identification system, a tape driver, a data backup storage system, etc.

Through the description of the above implementation manners, those skilled in the art can easily understand that the exemplary implementation manners described here can be implemented by software, or can be implemented by combining software with necessary hardware. Therefore, the technical solutions according to the implementation manners of the present disclosure can be embodied in the form of a software product, and the software product can be stored in a non-volatile storage medium (which may be a CD-ROM, USB disk, mobile hard disk, etc.) or on the network, and includes several instructions to make a computing device (which may be a personal computer, a server, a terminal apparatus, or a network device, etc.) execute the method according to the implementation manners of the present disclosure.

In an exemplary embodiment of the present disclosure, there is also provided a computer-readable storage medium on which a program product capable of implementing the above-mentioned method of the present specification is stored. In some possible implementation manners, various aspects of the present disclosure may also be implemented in the form of a program product, which includes program code. When the program product runs on a terminal device, the program code is used to make the terminal device perform the steps according to various exemplary embodiments of the present disclosure described in the above-mentioned "exemplary method" section of the present specification.

A program product for implementing the above method according to an implementation manner of the present disclosure is described. The program product may use a portable compact disc read-only memory (CD-ROM) and include the program code, which may run on a terminal device, for example, a personal computer. However, the program product of the present disclosure is not limited thereto. In the present disclosure, the readable storage medium may be a tangible medium containing or storing program, and the program may be used by or in combination with an instruction execution system, apparatus, or device.

The computer-readable signal medium may include a data signal in baseband or propagated as a part of a carrier, which carries readable program code. Such a propagated data signal may take many forms, including but not limited to electromagnetic signals, optical signals, or any suitable combination of the foregoing. The readable signal medium may also be any readable medium other than a readable storage medium, and the readable medium may send, propagate, or transmit a program for use by or in combination with an instruction execution system, apparatus, or apparatus.

The program code contained on the readable medium may be transmitted using any appropriate medium, including but not limited to wireless, wired, optical cable, RF, etc., or any suitable combination of the foregoing.

The program code for performing the operations of the present disclosure may be written in any combination of one or more programming languages, which include object-oriented programming languages, such as Java. C++, etc. and further include conventional procedural programming languages, such as 'C' or similar programming languages. The program code may be executed entirely or partly on the user computing device, may be executed as an independent software package, may be executed partly on the user computing device and partly on the remote computing device, or may be executed entirely on the remote computing device or server. In the case of involving remote computing device, the remote computing device may be connected to the user computing device via any kind of network, including a local area network (LAN) or a wide area network (WAN), or it may be connected to an external computing device, for example, connected to an external computing device via the Internet by using an Internet service provider.

It should be noted that although several modules or units of device for action execution are mentioned in the above detailed description, this division is not mandatory. In fact, according to the implementation manners of the present disclosure, features and functions of two or more modules or units described above may be embodied in one module or unit. On the contrary, features and functions of one module or unit described above can be further divided and embodied by a plurality of modules or units.

Furthermore, although the steps of the method in the present disclosure are described in a specific order in the accompanying drawings, this does not require or imply that these steps must be performed in this specific order, or that all the illustrated steps must be performed to achieve the desired results. Additionally or alternatively, some steps may be omitted, a plurality of steps may be combined into one step for execution, and/or one step may be decomposed into a plurality of steps for execution, etc.

Through the description of the above implementation manners, those skilled in the art can easily understand that the exemplary implementation manners described here may be implemented by software, or may be implemented by combining software with necessary hardware. Therefore, the technical solution according to the implementation manners of the present disclosure may be embodied in the form of a software product, and the software product may be stored in a non-volatile storage medium (which may be a CD-ROM, a USB disk, a mobile hard disk, etc.) or on the network, and includes several instructions to make a computing device (which may be a personal computer, a server, a mobile terminal, or a network device, etc.) execute the method according to the implementation manners of the present disclosure.

Other embodiments of the present disclosure will be easily thought of by those skilled in the art after considering the specification and practicing the present disclosure. The present disclosure is intended to cover any variations, uses or adaptations of the present disclosure, which follow the general principles of the present disclosure and include common knowledge or common technical means in the technical field that are not disclosed in the present disclosure. The specification and embodiments are to be regarded as exemplary only, with a true scope and spirit of the present disclosure being indicated by the appended claims.

INDUSTRIAL PRACTICABILITY

According to the solutions provided by the present disclosure, the first neural network is trained by means of the speaker record sample to obtain a speaker recognition model, the training result output by the first neural network is the speaker vector sample, and the second neural network is trained by means of the unaccompanied singing vocal sample and the speaker vector sample to obtain the unaccompanied singing synthesis model, so that the synthesis efficiency of the model is improved, and it is not necessary to collect a large number of record data to generate a corpus. Furthermore, by inputting the speaker record to be synthesized into the speaker recognition model, obtaining the speaker information output from the intermediate hidden layer of the speaker recognition model, and inputting the unaccompanied singing music information to be synthesized and the speaker information into the unaccompanied singing synthesis model to obtain the synthesized customized timbre vocal, only a small amount of linguistic data is needed to train the user-customized timbre, and the effect of vocal synthesis is achieved by adjusting the rhythm and pitch of the synthesized voice, which reduces the time and training linguistic data needed in the process of synthesizing the customized timbre vocal and improves the synthesis efficiency of the customized timbre vocal.

What is claimed is:

1. A method for synthesizing a customized timbre vocal, wherein the method comprises:
    training a first neural network by means of a speaker record sample to obtain a speaker recognition model, a training result output by the first neural network being a speaker vector sample;
    training a second neural network by means of an unaccompanied singing vocal sample and the speaker vector sample to obtain an unaccompanied singing synthesis model;
    inputting a speaker record to be synthesized into the speaker recognition model, and acquiring speaker information output by an intermediate hidden layer of the speaker recognition model; and
    inputting unaccompanied singing music information to be synthesized and the speaker information into the unaccompanied singing synthesis model to obtain a synthesized customized timbre vocal.

2. The method for synthesizing a customized timbre vocal according to claim 1, wherein the training the first neural network by means of the speaker record sample to obtain the speaker recognition model, comprises:
    dividing the speaker record sample into a test record sample and a registered record sample, and inputting the test record sample and the registered record sample into the first neural network;
    outputting a registered record feature through the first neural network based on the registered record sample, and performing a mean-pooling on the registered record feature to obtain a registered record vector;

outputting a test record vector through the first neural network based on the test record sample;

performing a cosine similarity calculation on the registered record vector and the test record vector to obtain a cosine similarity result;

performing a parameter optimization on the first neural network through the cosine similarity result and a regression function until a loss value of the regression function is minimum; and determining the first neural network after the parameter optimization as the speaker recognition model.

3. The method for synthesizing a customized timbre vocal according to claim 1, wherein the unaccompanied singing synthesis model comprises a duration model, an acoustic model and a vocoder model, and the training the second neural network by means of the unaccompanied singing vocal sample and the speaker vector sample to obtain the unaccompanied singing synthesis model, comprises:

analyzing a music score sample, a lyric sample and a phoneme duration sample in the unaccompanied singing vocal sample; and training the duration model by means of the speaker vector sample, the music score sample, the lyrics sample and the phoneme duration sample, an output result of the duration model being a duration prediction sample.

4. The method for synthesizing a customized timbre vocal according to claim 1, wherein the unaccompanied singing synthesis model comprises a duration model, an acoustic model and a vocoder model, and the training the second neural network by means of the unaccompanied singing vocal sample and the speaker vector sample to obtain the unaccompanied singing synthesis model, comprises:

analyzing a music score sample, a lyric sample and a phoneme duration sample in the unaccompanied singing vocal sample;

extracting a Mel spectrogram sample according to a song in the unaccompanied singing vocal sample; and training the acoustic model by means of the speaker vector sample, the phoneme duration sample, the music score sample, the lyrics sample and the Mel spectrogram sample, an output result of the acoustic model being a Mel spectrogram prediction sample.

5. The method for synthesizing a customized timbre vocal according to claim 1, wherein the unaccompanied singing synthesis model comprises a duration model, an acoustic model and a vocoder model, and the training the second neural network by means of the unaccompanied singing vocal sample and the speaker vector sample to obtain the unaccompanied singing synthesis model, comprises:

extracting a Mel spectrogram sample according to a song in the unaccompanied singing vocal sample; and training the vocoder model by means of the Mel spectrogram sample, an output result of the vocoder model being an audio prediction sample.

6. The method for synthesizing a customized timbre vocal according to claim 1, wherein the unaccompanied singing synthesis model comprises a duration model, an acoustic model and a vocoder model, and the inputting the unaccompanied singing music information to be synthesized and the speaker information into the unaccompanied singing synthesis model to obtain the synthesized customized timbre vocal, comprises:

analyzing a music score to be synthesized and a lyric to be synthesized in the unaccompanied singing music information;

inputting the speaker information, the music score to be synthesized and the lyric to be synthesized into the duration model, an output result of the duration model being a duration prediction result to be synthesized;

inputting the duration prediction result, the speaker information, the music score to be synthesized and the lyric to be synthesized into the acoustic model, an output result of the acoustic model being a Mel spectrogram prediction result to be synthesized; and inputting the Mel spectrogram prediction result into the vocoder model, an output result of the vocoder model being the synthesized customized timbre vocal.

7. The method for synthesizing a customized timbre vocal according to claim 6, wherein the analyzing the music score to be synthesized and the lyric to be synthesized in the unaccompanied singing music information, comprises:

performing a text analysis and a feature extraction on a music score and a lyric in the unaccompanied singing music information to acquire the music score to be synthesized and the lyric to be synthesized.

8. The method for synthesizing a customized timbre vocal according to claim 6, wherein the inputting the duration prediction result, the speaker information, the music score to be synthesized and the lyric to be synthesized into the acoustic model, the output result of the acoustic model being a Mel spectrogram prediction result to be synthesized, comprises:

performing a frame-level extension on the duration prediction result, the music score to be synthesized and the lyric to be synthesized; and inputting a result of the frame-level extension and the speaker information into the acoustic model, the output result of the acoustic model being the Mel spectrogram prediction result to be synthesized.

9. An electronic device, comprising:

a processor; and a memory, configured to store executable instructions of the processor;

wherein by executing the executable instructions, the processor is configured to:

train a first neural network by means of a speaker record sample to obtain a speaker recognition model, a training result output by the first neural network being a speaker vector sample;

train a second neural network by means of an unaccompanied singing vocal sample and the speaker vector sample to obtain an unaccompanied singing synthesis model;

input a speaker record to be synthesized into the speaker recognition model, and acquire speaker information output by an intermediate hidden layer of the speaker recognition model; and input unaccompanied singing music information to be synthesized and the speaker information into the unaccompanied singing synthesis model to obtain a synthesized customized timbre vocal.

10. The electronic device according to claim 9, wherein the processor is further configured to:

divide the speaker record sample into a test record sample and a registered record sample, and input the test record sample and the registered record sample into the first neural network;

output a registered record feature through the first neural network based on the registered record sample, and perform a mean-pooling on the registered record feature to obtain a registered record vector;
output a test record vector through the first neural network based on the test record sample;
perform a cosine similarity calculation on the registered record vector and the test record vector to obtain a cosine similarity result;
perform a parameter optimization on the first neural network through the cosine similarity result and a regression function until a loss value of the regression function is minimum; and
determine the first neural network after the parameter optimization as the speaker recognition model.

11. The electronic device according to claim 9, wherein the unaccompanied singing synthesis model comprises a duration model, an acoustic model and a vocoder model, and the processor is further configured to:
analyze a music score sample, a lyric sample and a phoneme duration sample in the unaccompanied singing vocal sample; and
train the duration model by means of the speaker vector sample, the music score sample, the lyrics sample and the phoneme duration sample, an output result of the duration model being a duration prediction sample.

12. The electronic device according to claim 9, wherein the unaccompanied singing synthesis model comprises a duration model, an acoustic model and a vocoder model, and the processor is further configured to:
analyze a music score sample, a lyric sample and a phoneme duration sample in the unaccompanied singing vocal sample;
extract a Mel spectrogram sample according to a song in the unaccompanied singing vocal sample; and
train the acoustic model by means of the speaker vector sample, the phoneme duration sample, the music score sample, the lyrics sample and the Mel spectrogram sample, an output result of the acoustic model being a Mel spectrogram prediction sample.

13. The electronic device according to claim 9, wherein the unaccompanied singing synthesis model comprises a duration model, an acoustic model and a vocoder model, and the processor is further configured to:
extract a Mel spectrogram sample according to a song in the unaccompanied singing vocal sample; and
train the vocoder model by means of the Mel spectrogram sample, an output result of the vocoder model being an audio prediction sample.

14. The electronic device according to claim 9, wherein the unaccompanied singing synthesis model comprises a duration model, an acoustic model and a vocoder model, and the processor is further configured to:
analyze a music score to be synthesized and a lyric to be synthesized in the unaccompanied singing music information;
input the speaker information, the music score to be synthesized and the lyric to be synthesized into the duration model, an output result of the duration model being a duration prediction result to be synthesized;
input the duration prediction result, the speaker information, the music score to be synthesized and the lyric to be synthesized into the acoustic model, an output result of the acoustic model being a Mel spectrogram prediction result to be synthesized; and
input the Mel spectrogram prediction result into the vocoder model, an output result of the vocoder model being the synthesized customized timbre vocal.

15. The electronic device according to claim 14, wherein the processor is further configured to:
perform a text analysis and a feature extraction on a music score and a lyric in the unaccompanied singing music information to acquire the music score to be synthesized and the lyric to be synthesized.

16. The electronic device according to claim 14, wherein the processor is further configured to:
perform a frame-level extension on the duration prediction result, the music score to be synthesized and the lyric to be synthesized; and
input a result of the frame-level extension and the speaker information into the acoustic model, the output result of the acoustic model being the Mel spectrogram prediction result to be synthesized.

17. A non-transitory computer-readable storage medium, with a computer program stored thereon, wherein
the computer program, when executed by a processor, realizes:
training a first neural network by means of a speaker record sample to obtain a speaker recognition model, a training result output by the first neural network being a speaker vector sample;
training a second neural network by means of an unaccompanied singing vocal sample and the speaker vector sample to obtain an unaccompanied singing synthesis model;
inputting a speaker record to be synthesized into the speaker recognition model, and acquiring speaker information output by an intermediate hidden layer of the speaker recognition model; and
inputting unaccompanied singing music information to be synthesized and the speaker information into the unaccompanied singing synthesis model to obtain a synthesized customized timbre vocal.

18. The non-transitory computer-readable storage medium according to claim 17, wherein the processor is further configured to:
divide the speaker record sample into a test record sample and a registered record sample, and input the test record sample and the registered record sample into the first neural network;
output a registered record feature through the first neural network based on the registered record sample, and perform a mean-pooling on the registered record feature to obtain a registered record vector; output a test record vector through the first neural network based on the test record sample;
perform a cosine similarity calculation on the registered record vector and the test record vector to obtain a cosine similarity result;
perform a parameter optimization on the first neural network through the cosine similarity result and a regression function until a loss value of the regression function is minimum; and
determine the first neural network after the parameter optimization as the speaker recognition model.

19. The non-transitory computer-readable storage medium according to claim 17, wherein the unaccompanied singing synthesis model comprises a duration model, an acoustic model and a vocoder model, and the processor is further configured to:
analyze a music score sample, a lyric sample and a phoneme duration sample in the unaccompanied singing vocal sample; and
train the duration model by means of the speaker vector sample, the music score sample, the lyrics sample and the phoneme duration sample, an output result of the duration model being a duration prediction sample.

20. The non-transitory computer-readable storage medium according to claim 17, wherein the unaccompanied singing synthesis model comprises a duration model, an acoustic model and a vocoder model, and the processor is further configured to:

analyze a music score sample, a lyric sample and a phoneme duration sample in the unaccompanied singing vocal sample;

extract a Mel spectrogram sample according to a song in the unaccompanied singing vocal sample; and train the acoustic model by means of the speaker vector sample, the phoneme duration sample, the music score sample, the lyrics sample and the Mel spectrogram sample, an output result of the acoustic model being a Mel spectrogram prediction sample.

\* \* \* \* \*